United States Patent [19]

Seiersen

[11] Patent Number: 5,317,496
[45] Date of Patent: May 31, 1994

[54] DC/DC-CONVERTER WITH A PRIMARY CIRCUIT AND AT LEAST ONE SECONDARY CIRCUIT TUNED AS INDIVIDUALLY OSCILLATORY CIRCUITS

[76] Inventor: Ole S. Seiersen, Georginevej 2, DK-2970 Horsholm, Denmark

[21] Appl. No.: 861,836
[22] PCT Filed: Dec. 18, 1990
[86] PCT No.: PCT/DK90/00331
§ 371 Date: Jun. 19, 1992
§ 102(e) Date: Jun. 19, 1992
[87] PCT Pub. No.: WO91/09455
PCT Pub. Date: Jun. 27, 1991

[30] Foreign Application Priority Data

Dec. 19, 1989 [DK] Denmark ............... 6465/89

[51] Int. Cl.$^5$ .................................... H02M 3/335
[52] U.S. Cl. ...................... 363/24; 363/134; 323/266
[58] Field of Search ........... 363/24, 25, 26, 97, 363/124, 134; 323/266

[56] References Cited

U.S. PATENT DOCUMENTS

| | | | |
|---|---|---|---|
| 4,034,280 | 7/1977 | Cronin et al. | 363/97 |
| 4,685,041 | 7/1987 | Bowman et al. | 363/126 |
| 4,763,237 | 7/1988 | Wieczorek | 363/124 |
| 4,785,387 | 11/1988 | Lee et al. | 363/97 |
| 4,788,634 | 11/1988 | Schlecht et al. | 323/266 |
| 4,814,962 | 3/1989 | Magalhaes et al. | 363/98 |
| 4,893,227 | 1/1990 | Gallios et al. | 363/26 |
| 5,070,439 | 12/1991 | Remson | 363/24 |
| 5,099,406 | 3/1992 | Harada et al. | 363/98 |
| 5,166,869 | 11/1992 | Hesterman | 363/25 |
| 5,177,675 | 1/1993 | Archer | 363/134 |

FOREIGN PATENT DOCUMENTS

| | | | |
|---|---|---|---|
| 0077958B1 | 10/1982 | European Pat. Off. | H02M 3/335 |
| 0257817A2 | 7/1987 | European Pat. Off. | H02M 3/335 |
| 0343855A2 | 5/1989 | European Pat. Off. | H02M 3/337 |
| 8005577-5 | 8/1980 | Finland . | |

OTHER PUBLICATIONS

Weinberg and Ghislanzoni, "A New Zero Voltage And Zero Current Power Switching Technique", Dec. 1990, PESC 89.

Primary Examiner—Jeffrey L. Sterrett
Attorney, Agent, or Firm—Willian Brinks Hofer Gilson & Lione

[57] ABSTRACT

A voltage converter is provided comprising a primary circuit which, with an input voltage, is connected through at least one primary winding to at least one respective secondary winding of at least one secondary circuit. The primary circuit and the at least one secondary circuit are tuned individually so that each comprises an oscillatory circuit with coinciding resonance frequencies.

12 Claims, 3 Drawing Sheets

DC/DC-CONVERTER WITH A PRIMARY CIRCUIT AND AT LEAST ONE SECONDARY CIRCUIT TUNED AS INDIVIDUALLY OSCILLATORY CIRCUITS

BACKGROUND OF THE INVENTION

The invention concerns a voltage converter comprising a transformer through which a primary circuit is connected to at least one secondary circuit, wherein a voltage applied to the input of the primary circuit is converted to output voltages on respective secondary circuits.

A.H. Weinberg and L. Ghislanzoni: "A new Zero Voltage and Zero Current Power Switching Technique." PESC 89 provides a DC voltage converter with a constant ratio of conversion. The converter uses a transformer through which a primary circuit is coupled to one or more secondary circuits. The primary circuit has two electrical switches which periodically reverse the voltage across the primary windings wound around the core of the transformer. When the first switch is switched off, double voltage will be present across the second switch. The parallel inductance of the transformer now forms a resonance circuit with the parasitic capacities across the switches. The magnetizing current in the transformer resonantly recharges these capacities so that there will be no voltage across the second switch after a period of time. The second switch can then be switched on without instantaneous great voltage changes and with a greatly reduced loss. When the second switch is switched off again, a corresponding process takes place. This art is also described in the European Patent Specification EP 0 077 958.

When one of the switches is switched on, a series resonance circuit will be formed, consisting of an inductance in series with the transformer (the inductance may e.g. consist of the parasitic series inductance of the transformer) as well as a capacity on either the primary side or on each of the outputs on the secondary side, and resonant energy transfer takes place from the primary side to the secondary side. When the current in the resonance circuit is zero, the on-switch can be switched off without instantaneous great current changes and with a greatly reduced loss.

The prior art operates satisfactorily as long as the loads on the respective secondary circuits are of the same order and are fairly constant. When the load distribution is very skew, e.g. a 90% load on one tap and a 10% load on another tap, the output voltage drops in relation to the nominal value on the tap most loaded. Correspondingly, the voltage rises with respect to the nominal value on the tap least loaded. These deviations from the nominal voltage values (cross-regulation) entail that the voltage converters of the prior art are not useful where precise feed voltages are required, and where extreme load distributions may occur.

Further, it is necessary that the employed transformer is optimized with respect to the parasitic series inductance such that in case of capacitive tuning on the primary side the parasitic series inductance on the secondary side must be insignificant and reverse. If this requirement is not satisfied, the tuning frequency varies with the load distribution, and the switches can no longer be expected to be switched off with low losses. It may be difficult to fully satisfy this requirement in practice, and even partial satisfaction of the requirement may be inconsistent with the requirement of low power losses in the transformer.

SUMMARY OF THE INVENTION

The object of the invention is to provide a voltage converter which is optimized with respect to cross-regulation, and which has a constant tuning frequency irrespective of the load distribution.

These optimum conditions may be realized with a simple tuning technique where both the primary side and each of the output circuits on the secondary side are individually tuned to form oscillatory circuits with like resonance frequency.

The voltage converter may moreover comprise a switching circuit adapted to reverse the current in one or more primary windings with a constant switching frequency. The resonance frequency of the respective oscillatory circuits may advantageously be of the same order as the switching frequency. The voltage converter of the invention has a plurality of advantages, and there will e.g. not be any interaction (cross-regulation) between the outputs on the secondary side. The tuning frequency will be independent upon the load distribution and will continue to be constant even if the load distribution is changed. The power transformer may be optimized exclusively with a view to minimizing losses and without having regard to either primary or secondary tuning.

Furthermore, the limits with respect to the physical circuit layout may be eliminated since almost any practically occurring circuit inductance, e.g. connection to and through rectifier diodes and tuning capacities can be combined in a distributed circuit tuning, without this having a negative impact on the performance of the converter.

An explanation of the above-mentioned effects can be found in the equivalent diagram shown in FIG. 4 of the periods in which one contact is made. All the secondary sides are converted to the primary side. The primary side of the converter and each of the secondary sides are equated with a series connection consisting of a coil and a current generator connected in parallel with a capacity. All these series connections are connected to earth and to a common node $V^*$. The coils will typically be identical with the parasitic series inductances of the transformer. This equivalent diagram can be applied to both the prior art and to the invention. In the prior art with primary tuning, the capacities on the secondary side, however, will be very great. The voltage in the node $V^*$ will then depend upon the load on the individual outputs, and considerable cross-regulation will be observed. Furthermore, the effective tuning inductance and thereby the tuning frequency depend upon the load distribution.

On the other hand, if the primary side and each of the output circuits on the secondary side are tuned individually to the same resonance frequency, a current will run on the primary side at this frequency, said current being distributed to each of the secondary circuits. Since each individual branch is tuned to this frequency, the voltage drop across the coil in a branch is just as great as, but oppositely directed, the voltage drop across the capacity in the same branch. The common node $V^*$ will hereby have the same voltage as earth irrespective of the load distribution, and there is no longer any interaction between the individual outputs.

BRIEF DESCRIPTION OF THE DRAWINGS

The invention will be explained more fully below in connection with preferred embodiments and with reference to the drawing, in which.

DETAILED DESCRIPTION OF PREFERRED EMBODIMENTS

Figure 1:
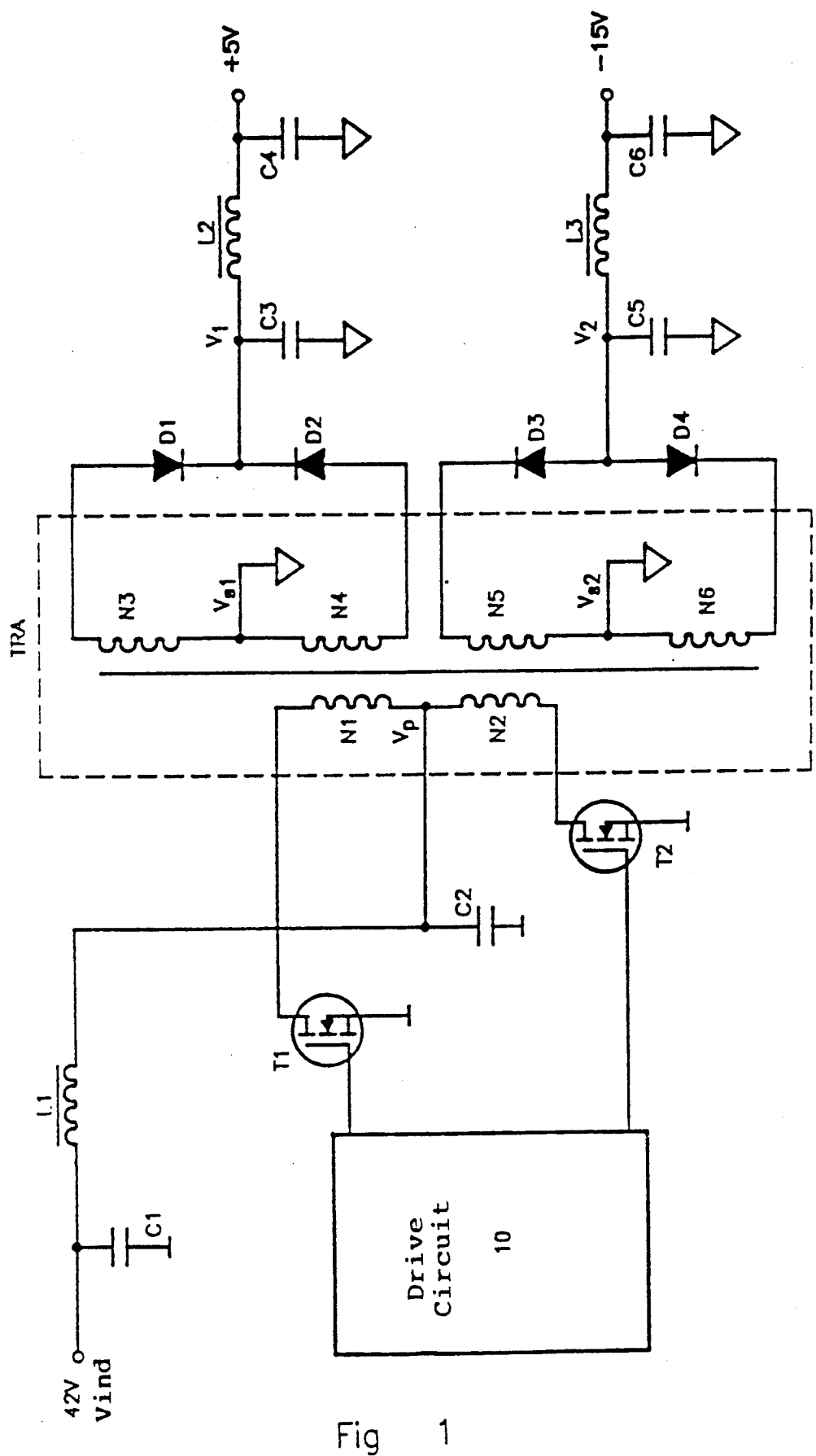
FIG. 1 shows a preferred embodiment of a voltage converter according to the invention.

FIG. 1 shows a preferred embodiment of a DC voltage converter according to the invention. The converter is based on a transformer coupling TRA, through which a primary side is coupled to one or more output circuits on the secondary side.

Figure 3:
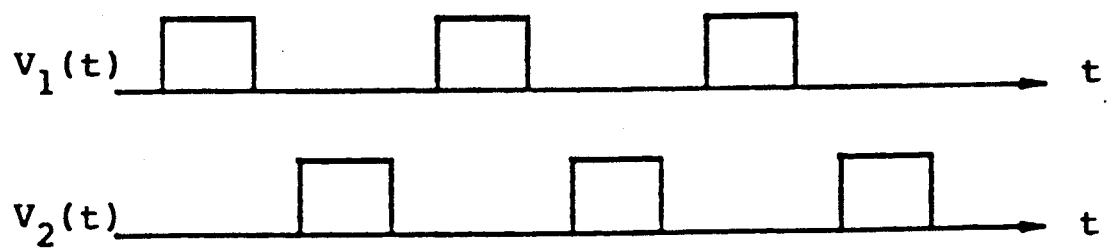
FIG. 3 shows two voltage signals applied to the control electrodes on the transistors $T_1$ and $T_2$ shown in FIGS. 1 and 2.

An input terminal $V_{ind}$ is connected to earth through a capacitor $C_1$ and is connected through a coil $L_1$ to a node $V_p$. The node $V_p$ is moreover connected to earth through a capacitor $C_2$. The node $V_p$ is the center of two transformer windings $N_1$, $N_2$ of the same size, where current through these windings $N_1$ and $N_2$ generates a flux in the transformer core, the direction of the flux being dependent upon which of the windings $N_1$, $N_2$ is conducting. A drive circuit 10 generates two identical, but time-delayed signals $V_1(t)$ and $V_2(t)$, which are shown in FIG. 3. The signals $V_1(t)$ and $V_2(t)$ are passed to respective control electrodes on FET transistors $T_1$ and $T_2$, which will be conducting with a positive voltage on the control electrode, i.e. while the signal is high.

Two output circuits are shown on the secondary side, a first output circuit supplying +5 volts, while a second output circuit supplies −15 volts. A first secondary winding $N_3$ and $N_4$ has a center $V_s$ connected to earth, while the extremities of the secondary coil $N_3$, $N_4$ are connected to a node $V_1$ through rectifier couplings. These rectifier couplings are illustrated with two diodes $D_1$ and $D_2$, it being generally known by skilled persons to parallel connect such rectifier diodes with a series connection of a resistor and a capacitor, to protect the diode against instantaneous high voltage values to thereby increase its life. The AC voltage induced in the secondary windings $N_3$ and $N_4$ is rectified through the rectifier coupling $D_1$ and $D_2$ so that there will be a DC voltage level in the node $V_1$ with a superimposed AC voltage. The DC voltage level depends upon the polarity of the diodes $D_1$ and $D_2$, and the voltage will be positive with the shown diode configuration. The node $V_1$ is connected to earth through a capacitor $C_3$ and to the output terminal with +5 volts through an inductance $L_2$. The output terminal with +5 volts is moreover connected to earth through a capacitor $C_4$. Correspondingly, the second output circuit has secondary windings $N_5$ and $N_6$ whose center $V_{s2}$ is connected to earth. The extremities of the secondary windings $N_5$, $N_6$ are connected to a node $V_2$ through rectifier couplings. The rectifier coupling, like in the first output circuit, is realized by two diodes $D_3$ and $D_4$, which can likewise advantageously be connected in parallel with a resistor and a capacitor. It is noted that the polarity of the diodes are oppositely directed to the diodes $D_1$, $D_2$ mentioned in connection with the first output circuit, it being desired to have a negative voltage of −15 volts on the output terminal of the second output circuit. The node $V_2$ is connected to earth through a capacitor $C_5$ and to the output terminal at −15 volts through an inductance $L_3$, the output terminal being moreover connected to earth through a capacitor $C_6$.

A current runs from the input terminal of +42 volts through the inductance $L_1$ toward the node $V_p$, and then the current alternately runs through the primary windings $N_1$ and $N_2$ in dependence upon which of the transistors $T_1$ and $T_2$ is conducting. This creates a flux of alternating polarity in the core in the transformer TRA, the flux direction being controlled by the added signal to the control electrodes on the transistors $T_1$ and $T_2$. The flux oscillator frequency in the transformer core will then correspond to the pulse repetition frequency in the signals from the drive circuit added to the control electrodes on the transistors $T_1$ and $T_2$. The drive circuit may e.g. be composed of an integrated circuit with the number UC1825 from the firm UNITRODE.

The oscillating flux in the transformer core induces currents in the secondary windings $N_3$, $N_4$, $N_5$, $N_6$ between which taps are provided to earth $V_{s1}$ and $V_{s2}$ or to the previously mentioned node $V_1$ and $V_2$ through rectifier couplings. The mean voltages in the nodes $V_1$ and $V_2$ are determined by the ratio of the number of secondary windings on the circuit concerned to the number of windings on the primary side. Since the node voltages $V_1$ and $V_2$ fluctuate violently, the voltage is smoothed by large smoothing capacities $C_4$ and $C_6$, respectively. The inductance $L_2$ and the capacitor $C_4$ may be considered to be a current generator with an infinitely great impedance. The same applies to the inductance $L_3$ and the capacitor $C_6$. According to the invention the primary side and each of the output circuits on the secondary side are tuned so as to individually comprise an oscillatory circuit with coinciding resonance frequency. It is thus possible to equate the circuit diagram shown in FIG. 1 with the equivalent diagram shown in FIG. 4. Since both the input terminals and the output terminals are contained in a current generator formed by a large smoothing capacitor, which is connected to earth and is "concealed" in terms of AC voltage by an inductance $L_1$, $L_2$, $L_3$ connected to the terminal, the current generator will have a very great AC voltage impedance and will therefore not be included in the resonance considerations. Thus, on the primary side it is the capacitor $C_2$ as well as the dispersion inductances associated with the windings $N_1$, $N_2$ which, together with various other dispersion inductances and capacities, constitute the oscillatory circuit. Similar considerations can be made with respect to the output side. The equivalent components marked ' are thus to be dimensioned such that the voltage drop across an inductance $L'_a$ is numerically just as great as the voltage drop across a capacitor $C'_a$, but with opposite polarity.

A balanced bridge will thus be obtained in which:

$$\omega L'_p = 1/(\omega C'_p) \qquad (1)$$

$$\omega L'_1 = 1/(\omega C'_1) \qquad (2)$$

$$\omega L'_a = 1/(\omega C'_a) \qquad (3)$$

The voltage on the star node V∗ will consequently be identical with the voltage in the node which is connected to earth. The current running through the individual oscillatory circuits creates no error voltage in the star node V∗.

The art described here of tuning a voltage converter so that each individual circuit forms a separate tuned oscillatory circuit, thus entails that a zero error node V∗ is obtained for a voltage converter with several output circuits.

Figure 2:
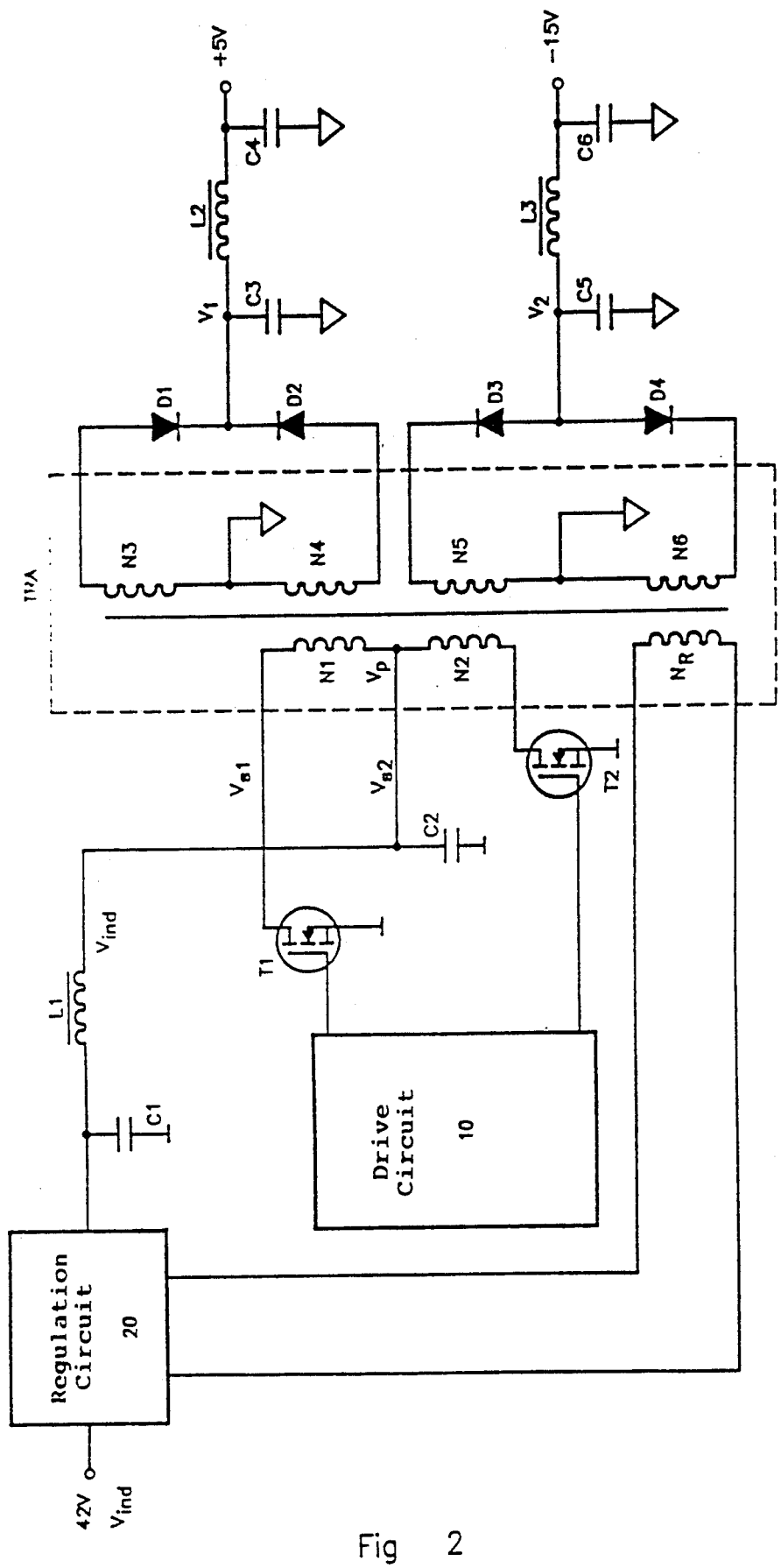
FIG. 2 shows an alternative embodiment of a voltage converter according to the invention.

The circuit shown in FIG. 1 may be improved additionally, which is shown in FIG. 2 where the voltage on the input terminal is controlled by a regulation circuit 20, which scans the flux in the iron core of the transformer with transformer windings $N_R$ arranged on the primary side, where the regulation provides a stiff primary voltage which thereby improves the stability on the output of the converter. When the regulation circuit 20 is moreover tuned to an oscillatory circuit with the same resonance frequency as the other circuits of the converter, it is achieved that the regulation circuit does not influence the other functions of the converter. The regulation circuit may be based on a regulater LM117 from National.

The invention has been explained in the foregoing with reference to a DC voltage converter, but the principle of distributed tuning so that the primary side and the output circuits on the secondary side are tuned individually to form individual oscillatory circuits with a common resonance frequency, can also be used in connection with an AC voltage converter. The drive circuit 10 converts precisely the DC voltage on the input to an AC voltage which is transferred through the transformer to the secondary windings, the rectifier couplings converting the AC voltage to a DC voltage signal which is additionally smoothed before reaching the output terminal.

Figure 4:
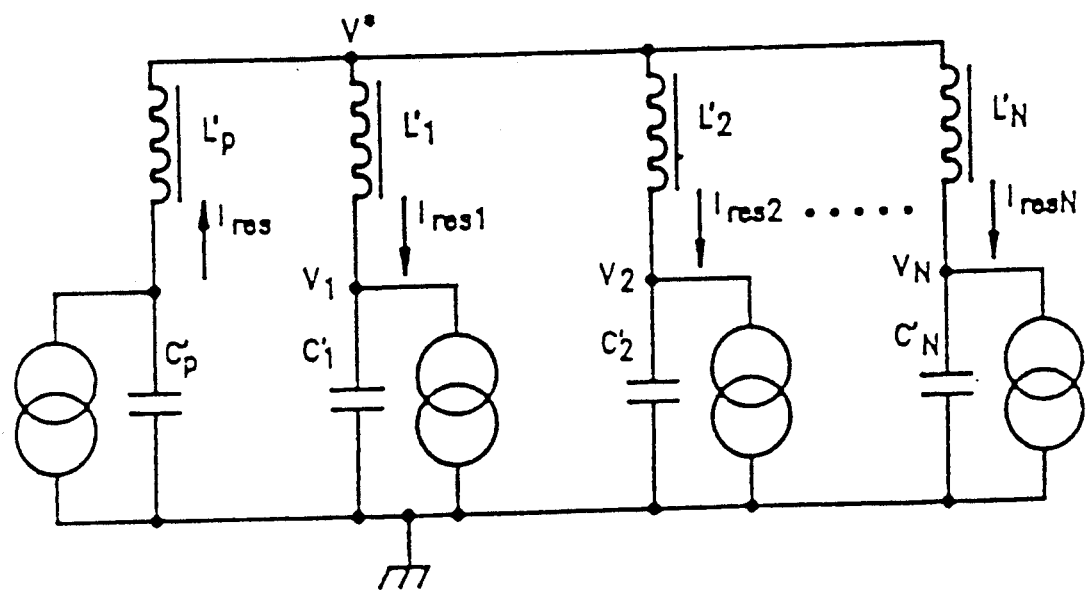
FIG. 4 is an equivalent diagram for the circuit shown in FIG. 1.

As will be seen in FIG. 4, it is possible to connect any number of output circuits on the secondary side to the node V∗.

The smoothing capacities $C_4$, $C_6$ with associated coils $L_2$, $L_3$ are mentioned in the foregoing as having such a great impedance that the individual couplings may be regarded as current generators. This will not be expedient in practice, but the principle outlined here will nevertheless be fully applicable even though the "current generators" do not exhibit an infinitely high impedance, and will therefore be included in the oscillatory circuits concerned. However, this contribution is so limited that it is not necessary to pay any regard to this in practice. The voltage converter is shown with just two secondary circuits in FIGS. 1 and 2, but this number has just been selected for simplicity and may thus be selected as needed from one secondary circuit and upwards.

What is claimed is:

1. A voltage converter comprising: a transformer coupling (TRA) through which a primary circuit having at least one primary winding ($N_1-N_2$) is coupled inductively to at least one secondary circuit having a secondary winding ($N_3-N_4$, $N_4-N_6$) where the primary circuit as regards AC voltage besides an inductive component ($L'_p$) in the form of the at least one primary winding ($N_1$, $N_2$) further comprises at least one capacitive component ($C_2$; $C'_p$) and where the at least one secondary circuit as regards AC voltage besides an inductive component ($L'_1-L'_N$) in the form of said secondary winding ($N_3-N_4$, $N_5-N_6$) further comprises capacitive and further inductive components, wherein the primary circuit and the at least one secondary circuit each comprise an oscillatory circuit with capacitive and inductive components ($C'_p$, $C'_1-C'_N$ and $L'_p$, $L'_1-L'_N$) and wherein each oscillatory circuit is tuned individually to substantially the same resonance frequency.

2. A voltage converter according to claim 1 further comprising an input terminal electrically associated with the primary circuit for accepting a DC voltage; wherein the voltage converter further comprises a switching circuit for defining a constant switching frequency to reverse current in the at least one primary winding ($N_1$, $N_2$) generated by the DC voltage; and wherein the switching frequency is substantially similar to the resonance frequency of each oscillatory circuit.

3. A voltage converter according to claim 2 further comprising an output terminal electrically associated with the at least one secondary circuit; and further comprising means ($D_1-D_4$) for rectifying and means ($C_4$, $C_6$) for smoothing current induced in the at least one secondary winding ($N_3-N_6$) so that a DC voltage level applied to the input terminal is converted into a different DC voltage level on the output terminal of the at least one secondary circuit.

4. A voltage converter according to claim 1 further comprising a regulation circuit including a transformer for sensing a given parameter; wherein the regulation circuit also includes means for regulating an input voltage in response to the given parameter sensed by the transformer; and wherein the regulation circuit is tuned to the resonance frequency.

5. A voltage converter according to claim 1 wherein the primary circuit has an input terminal for accepting a DC voltage level; wherein the at least one primary winding comprises two symmetrical primary windings ($N_1$, $N_2$) having a center ($V_p$); wherein the input terminal is electrically connected to the center ($V_p$) of the two symmetrical primary windings ($N_1$, $N_2$) through an inductive component ($L_1$); wherein the center ($V_p$) is also electrically connected to earth, through a capacitor ($C_2$); wherein the two symmetrical primary windings ($N_1$, $N_2$) have respective extremities electrically connected to respective transistors ($T_1$, $T_2$) whose states are controlled by a control circuit (10) connected thereto, and wherein the at least one secondary circuit has a plurality of secondary windings ($N_3$, $N_4$; $N_5$, $N_6$) and a center ($V_{s1}$; $V_{s2}$), wherein the plurality of secondary windings ($N_3$, $N_4$; $N_5$, $N_6$) are arranged symmetrically around the center ($V_{s1}$; $V_{s2}$) and are electrically connected to earth, wherein said secondary windings have extremities electrically connected to a node ($V_1$; $V_2$) through respective rectifier couplings ($D_1$, $D_2$; $D_3$, $D_4$), to produce a rectified voltage, wherein said node ($V_1$; $V_2$) is electrically connected partly to earth through a capacitor ($C_3$; $C_5$), and partly to an output terminal through an inductive component ($L_2$; $L_3$), and wherein said output terminal is electrically connected to earth through a smoothing capacitor ($C_4$; $C_6$).

6. A voltage converter comprising:
   a) a transformer coupling;
   b) a primary circuit comprising at least one primary winding;
   c) at least one secondary circuit comprising at least one secondary winding; the at least one primary winding being inductively coupled to the at least one secondary winding through the transformer coupling; the at least one primary winding, as regards AC voltage, forming an inductive component; the primary circuit further comprising at least one capacitive component; the at least one secondary winding, as regards AC voltage, forming an inductive component; the at least one secondary circuit further comprising a second inductive component and a capacitive component; the primary circuit being individually tunable to a primary resonance frequency; the at least one secondary circuit being individually tunable to a second resonance frequency; and the primary resonance frequency being substantially similar to the second resonance frequency.

7. A voltage converter according to claim 6 further comprising d) an input terminal electrically associated with the primary circuit; wherein the input terminal is adapted for accepting a DC voltage to generate current flow in the at least one primary winding; the voltage converter further comprising e) a switching circuit for generating a switching frequency for reversing the current flow in the primary winding; and wherein the switching frequency is substantially similar to the primary resonance frequency and the second resonance frequency.

8. A voltage converter according to claim 7 further comprising f) an output terminal electrically associated with the at least one secondary circuit; and further comprising g) a rectifier and h) a smoother for modifying current induced in the at least one secondary winding so that a DC voltage level applied to the input terminal is converted into a different DC voltage level on the output terminal of the at least one secondary circuit.

9. A voltage converter according to claim 8 wherein the rectifier includes a diode.

10. A voltage converter according to claim 8 wherein the smoother includes a capacitor.

11. A voltage converter according to claim 6 further comprising d) a regulation circuit; wherein the regulation circuit includes an element for sensing a given parameter; wherein the regulation circuit also includes a regulator for controlling an input voltage responsive to the given parameter; and wherein the regulation circuit is tuned to a frequency substantially similar to the primary resonance frequency and the second resonance frequency.

12. A voltage converter according to claim 11 wherein the given parameter is electromagnetic flux proximate the transformer coupling.

* * * * *

UNITED STATES PATENT AND TRADEMARK OFFICE
CERTIFICATE OF CORRECTION

PATENT NO. : 5,317,496
DATED : May 31, 1994
INVENTOR(S) : Ole S. Seiersen

It is certified that error appears in the above-indentified patent and that said Letters Patent is hereby corrected as shown below:

IN THE CLAIMS

Column 5, line 60, line 5, delete the second occurrence of "$N_4$" and substitute --$N_5$--.

Signed and Sealed this

Sixteenth Day of May, 1995

BRUCE LEHMAN

Attest:

Attesting Officer

Commissioner of Patents and Trademarks